United States Patent [19]

Machida et al.

[11] Patent Number: 4,706,149
[45] Date of Patent: Nov. 10, 1987

[54] TAPE CASSETTE

[75] Inventors: Tetsuo Machida; Kazuo Ozawa, both of Miyagi, Japan

[73] Assignee: Sony Corporation, Tokyo, Japan

[21] Appl. No.: 774,361

[22] Filed: Sep. 10, 1985

[30] Foreign Application Priority Data

Sep. 17, 1984 [JP] Japan ................... 59-194507

[51] Int. Cl.$^4$ .................. G11B 23/02; G03B 1/04
[52] U.S. Cl. ..................... 360/132; 242/199
[58] Field of Search .............. 360/132; 242/197–200; 206/387

[56] References Cited

U.S. PATENT DOCUMENTS 3,796,394 3/1974 Souza ........................... 360/132
3,900,170 8/1975 Serizawa ..................... 360/132 X
4,368,860 1/1983 Goto ............................ 242/199
4,484,248 11/1984 Ogiro ........................... 360/132

Primary Examiner—A. J. Heinz
Attorney, Agent, or Firm—Hill, Van Santen, Steadman & Simpson

[57] ABSTRACT

In a tape cassette, which comprises a cassette casing which consists of upper and lower halves which are molded by injection molding from a synthetic resin, reels mounted for rotation in the cassette casing and having at least lower flanges, and a groove formed in an outer surface of a bottom wall of the lower half in a region which is adjacent the lower flanges of the reels, an improvement comprises at least a projection being formed on at least a portion of an inner surface of the bottom wall of the lower half which overlies the guide groove so as to facilitate a flow of a molten resin injection near the guide groove during molding of the lower half.

5 Claims, 7 Drawing Figures

TAPE CASSETTE

BACKGROUND OF THE INVENTION

1. Field of the Invention

The present invention relates to a tape cassette which is optimally adapted for use in a recording and/or reproducing apparatus such as a video tape recorder and, more particularly, to a tape cassette, which comprises a cassette casing or housing, which is formed of upper and lower halves, which are molded by injection molding from a synthetic resin, reels which are mounted for rotation in the cassette casing and have at least lower flanges, and a groove which is formed in the outer surface of a bottom wall of the lower half of the casing with at least part of the groove being present in a region of the lower half that is adjacent each of the lower flanges.

2. Description of the Prior Art

A conventional tape cassette for a video tape recorder will be described with reference to FIGS. 1 to 3.

Referring to FIGS. 1 and 2, a cassette casing 1 is formed by vertically opposing upper and lower halves 2 and 3, which halves are molded from a synthetic resin and coupled together with screws or the like. A pair of reels 4 are mounted for rotation in the cassette casing 1 and a magnetic tape 5 is wound around the reels 4. The cassette 1 has a front opening 6 on one side and a front cover 7 is pivotally mounted on the casing to cover the front opening 6 of the cassette casing 1. The magnetic tape 5 is guided by a pair of tape guides 8 and runs in the front opening 6 along an inner surface side of the front cover 7.

Each reel 4 (FIG. 2) mounted in the casing 1 has an upper flange 9 and a lower flange 10. Ring-like hubs 11 protrude downward from the central lower portions of the reels 4 and are rotatably and loosely inserted into a pair of reel holes 12 formed in the bottom wall of the lower half 3 of the casing 1. At least one leaf spring 13 is disposed in a gap between an upper wall of the upper half 2 and the upper flanges 9 of the reels 4. Each leaf spring 13 is fixed at the central portion of its longitudinal direction to an inner surface 2a of the upper wall of the upper half 2 and the two ends of each spring 13 press the central portion of the upper surface of each corresponding reel 4 from above. Therefore, as shown in FIG. 2, the hubs 11 of the reels 4 are inserted into the holes 12, and lower surfaces 10a of the lower flanges 10 are tightly urged against an inner surface 3a of the bottom wall of the lower half 3.

A guide groove 15 is linearly formed in an outer surface 3b of the bottom wall of the lower half 3 of the cassette casing 1 to extend along the entire longitudinal direction (i.e., the left-to-right direction in FIG. 1). The guide groove 15 crosses, at positions adjacent the holes 12, the region of the lower half 3 which oppose the lower flanges 10 of the reels 4 housed in the cassette casing 1. In a magnetic tape cassette of this type for a video tape recorder, the guide groove 15 is formed as means for guiding the tape cassette when it is loaded in a video tape recorder. In the case shown in FIG. 3, the bottom wall of the lower half 3 has a thickness t1 of 2 mm, and the guide groove 15 is formed in the outer surface 3b of the bottom wall of the lower half 3 to have a width w1 of 3 mm and a depth t2 of 1.5 mm. An opening 16 (FIG. 1) is formed at the central portion of the guide groove 15 and serves as an insertion hole for receiving a reel lock release pin (not shown) provided in a video tape recorder.

The lower half 3 as described above is formed by injection molding from a synthetic resin. FIG. 3 shows a portion of an upper mold 18a and lower mold 18b near the groove 15. A projection 19 for forming the guide groove 15 is formed on a mold 18b. A molten resin is injected into the cavity defined between the molds 18a and 18b through an injection gate 20. When the injected resin is cooled, the lower half 3 having the guide groove 15 is molded.

However, the conventional tape cassette as shown in FIGS. 1 to 3 has the following problems.

Video tape recorders are becoming increasingly popular at homes and offices, and there is a strong demand for inexpensive magnetic tape cassettes. In order to respond to this demand, magnetic tape cassettes must be mass-produced. However, low molding efficiency of lower halves 3 has prevented mass-production of magnetic tape cassettes.

When a lower half 3 is injection molded, molten resin is radially injected in a direction indicated by arrows a (FIG. 1) to form the lower half 3 from the injection gate 20 which is formed at a location at the rear side and at a substantially central location in the longitudinal direction of the lower half 3. At this time, as shown in FIG. 3, the guide groove 15 is formed by the projection 19 of the mold 18b. However, since the cavity portion on the guide groove 15 is narrow due to the presence of the projection 19 for forming the groove 15, part of the molten resin which flows in a direction indicated by arrow b (FIG. 3) is severely restricted by the narrow portion and the flow speed of the molten resin is rendered very slow. As a result, molding of the lower half 3 is time-consuming, and the molding efficiency of the lower half 3 is degraded.

When the injection pressure of molten resin is increased in order to improve the flow speed of the resin, the pressure in the cavity portions other than the narrow portion on the guide groove 15 becomes excessively high. Then, when the molten resin is solidified, the lower half 3 will be firmly stuck to the pair of molds 18a and 18b and cannot be released easily therefrom. When two or more injection gates are arranged on both sides of the guide groove 15 and the molten resin is injected through these injection gates, the molten resin flows out of the gates at different speeds. When the molten resin solidifies, a resin boundary or weld line is formed. A weld line appears in the surface of the lower half 3 as a scratch, and impairs the outer appearance of the lower half 3. In addition, the mechanical strength of the lower half 3 is also impaired. For these reasons, only one injection gate 20 is preferable for injecting molten resin.

OBJECTS AND SUMMARY OF THE INVENTION

It is, therefore, an object of the present invention to significantly improve the molding efficiency of lower halves without either requiring two or more injection gates or increasing the injection pressure when the lower halves are injection molded from a synthetic resin.

In order to achieve the above object of the present invention, in a tape cassette of the type described above, and to facilitate flow of molten resin in a cavity portion near a guide groove, a projection is formed on at least a portion of an inner surface of the bottom wall of the lower half to overlie a portion of the guide groove. With this construction, when a lower half is molded by injection molding from a synthetic resin, the thickness of the lower half portion at the groove is relatively thicker due to the presence of the projection formed on at least a portion of the inner surface of the bottom wall of the lower half to overlie the groove, so that flow of the molten resin near the groove is excellent. For this reason, even if the injection pressure is not particularly increased or if two or more injection gates are not provided, the molding time of a lower half can be significantly reduced, and the molding efficiency of the lower half can be improved. Accordingly, mass-production of tape cassettes is facilitated, and inexpensive tape cassettes can be manufactured.

DETAILED DESCRIPTION OF THE PREFERRED EMBODIMENTS

Figure 1:
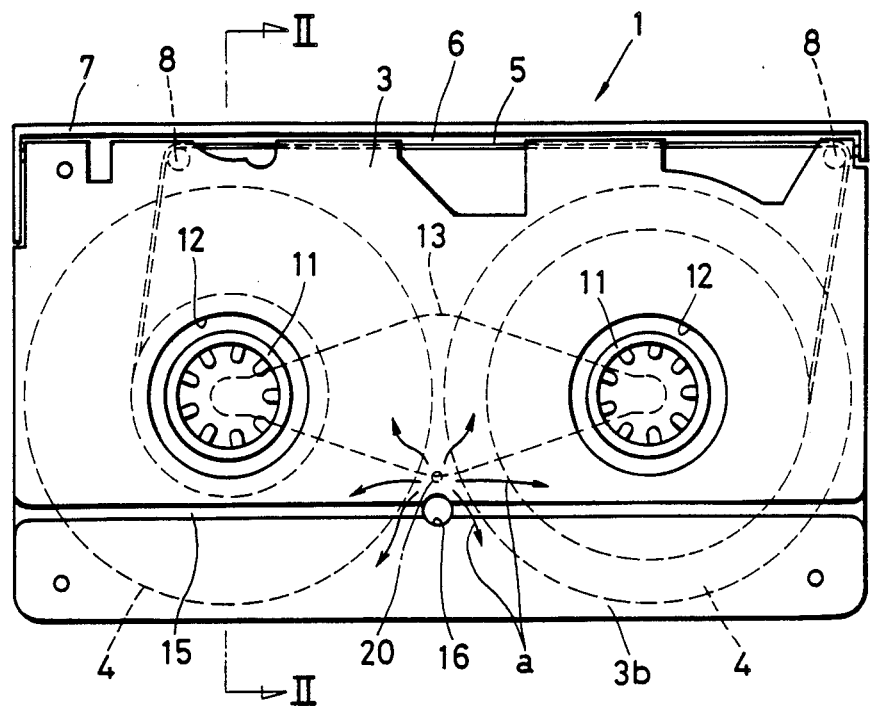
FIG. 1 is a bottom view showing a prior art or conventional magnetic tape cassette for a video tape recorder.
Figure 2:
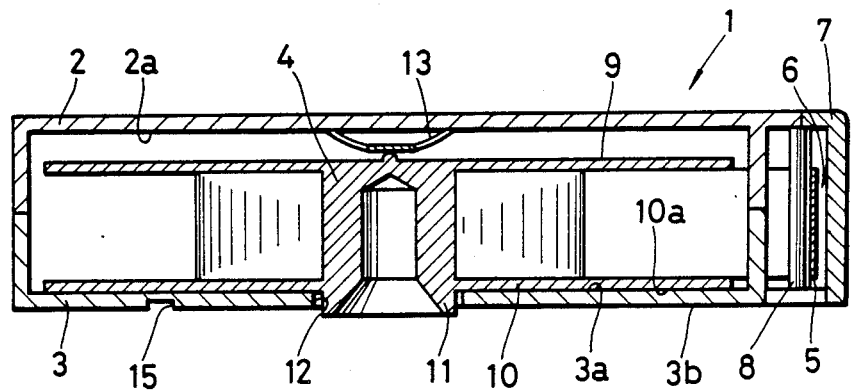
FIG. 2 is an enlarged cross-sectional view of the prior art tape cassette taken along the line II—II of FIG. 1.
Figure 3:
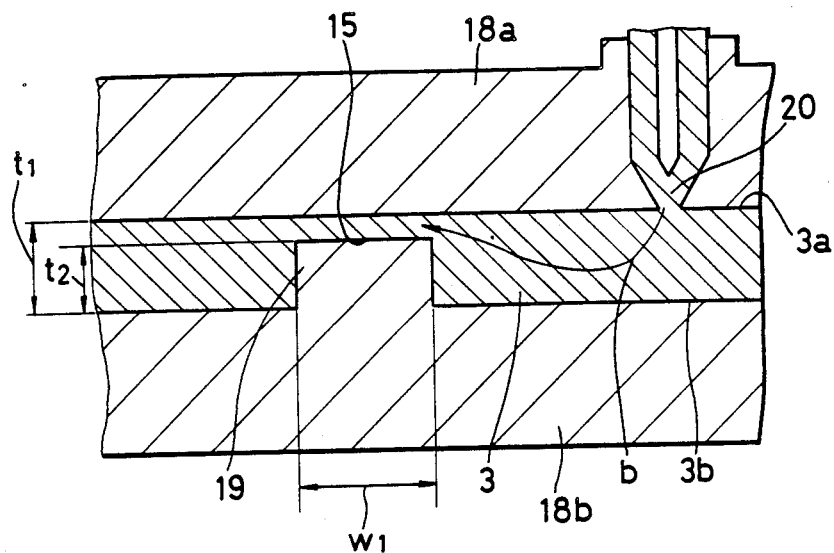
FIG. 3 is an enlarged cross-sectional view of a main part of the cassette shown in FIG. 1 for explaining the molding of a lower half.

The principles of the present invention applied to magnetic tape cassettes for a video tape recorder are illustrated in FIGS. 4 to 7. The same reference numerals as in the conventional or prior art tape cassette shown in FIGS. 1 to 3 denote the same parts in FIGS. 4 to 7 and a detailed description thereof will be omitted.

Figure 4:
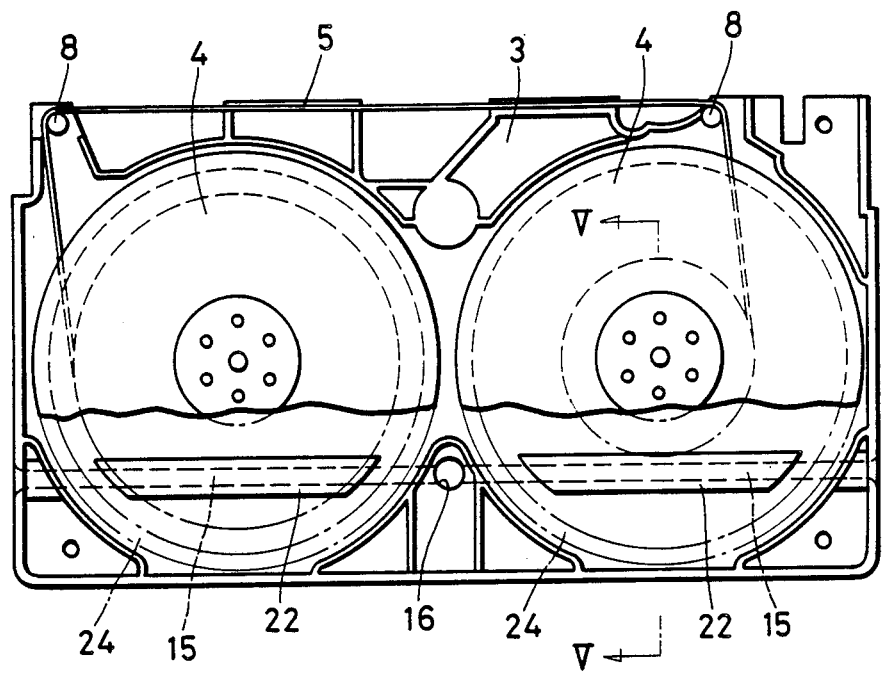
FIG. 4 is a plan view of a lower half with parts of reels cut away for purposes of illustration of a magnetic tape cassette for a video tape recorder according to an embodiment of the present invention.
Figure 5:
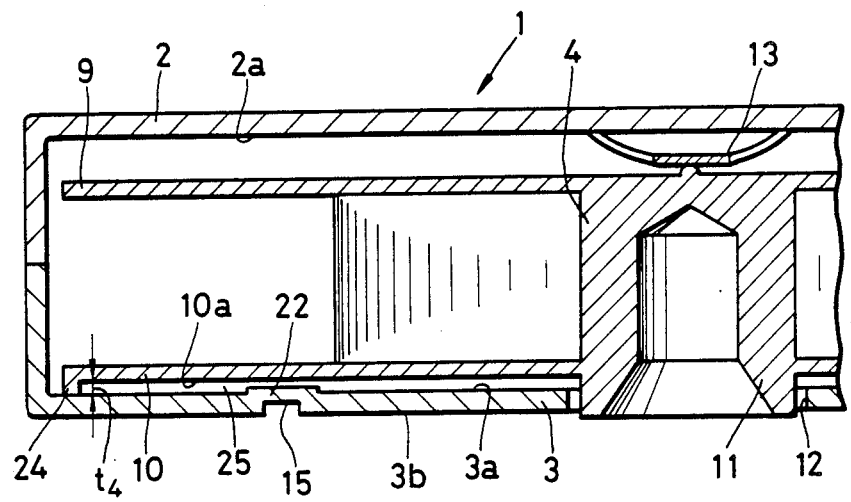
FIG. 5 is an enlarged cross-sectional view of the lower half taken along the line V—V of FIG. 4.
Figure 6:
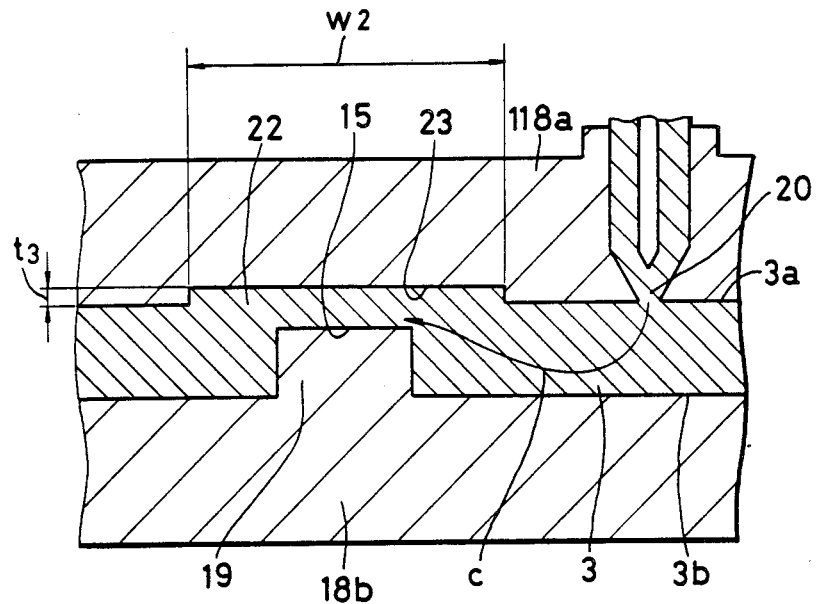
FIG. 6 is an enlarged cross-sectional view of a main part of the tape cassette shown in FIG. 4 for explaining the molding of the lower half.

FIGS. 4 to 6 show one embodiment of the present invention. In a tape cassette according to the present invention, projections 22 having a substantially rectangular cross-section are formed in those portions of an inner surface 3a of the bottom wall of a lower half 3 which correspond to a guide groove 15 of an outer surface 3b of the bottom wall of the lower half 3. The projection 22 projects upward, and its upper end face is a horizontal flat surface that is parallel to the inner surface 3a. The projection 22 is formed to overlap the guide groove 15 and to have a width larger than that of the guide groove 15 in a region of the inner surface 3a of the bottom wall of the lower half 3, which region is opposite the lower surface 10a of the lower flange 10 of each corresponding reel 4 without the outer peripheral portion of the lower surface 10a. The projection 22 is formed, for example, to have a width w2 in the range of 7 to 8 mm and a height t3 in the range of 0.10 to 0.14 mm, as shown in FIG. 6. In general, however the height t3 may be in the range of 0.05 to 0.5 mm. Referring to FIGS. 4 to 6, the structure excluding the projection 22 and a projection 24 formed on the lower side surface 10a of the lower flange 10 of each reel 4 remains substantially the same as that of the conventional tape cassette shown in FIGS. 1 to 3.

The lower half 3 is molded by injection molding from a synthetic resin between a pair of molds 118a and 18b, as shown in FIG. 6. A recess 23 for forming the projection 22 is formed in the mold 118a. When molten resin is injected between the molds 118a and 18b from an injection gate 20, the molten resin partially flows in a direction indicated by arrow c (FIG. 6) and the guide groove 15 and the projection 22 are formed by the projection 19 and the recess 23.

During this molding, since a sufficient gap is guaranteed above the guide groove 15 by the recess 23 for forming the projection 22, the flow speed of the molten resin along the direction c will not be rendered extremely slow at the portion of the guide groove 15 due to the presence of the projection 19. Therefore, the molding time of the lower half can be significantly reduced, and the molding efficiency of the lower half 3 is improved. Since the injection pressure of the molten resin need not be increased and two or more injection gates 20 need not be provided, the lower half 3 will not become firmly stuck to the pair of molds 118a and 18b and a weld line or the like will not be formed in the lower half 3.

As shown in FIG. 5, in addition to the projection 22, which is formed on the inner surface 3a of the bottom wall of the lower half 3, a projection 24 downwardly projects from the lower surface 10a of the lower flange 10 of each reel 4. The projection 24 is formed integrally to be either a continuous or discontinuous annular form with the outer periphery of the lower surface 10a of the lower flange 10 of each reel 4. The projection 24 can have a height t4 of, 0.2 mm for example. Therefore, due to the presence of the projections 24, the lower surfaces 10a of the lower flanges 10 of the reels 4 float from the inner surface 3a of the bottom wall of the lower half 3. In this manner, a gap 25 having a size corresponding to the height t4 is defined between the lower surfaces 10a and the inner surface 3a of the bottom wall. The projections 22 are located within this gap 25, and the two ends of each projection 22 are located in a region surrounded by the corresponding projection 24, as shown in FIG. 4. In other words, when the reels 4 rotate, the projections 22 are located inside the rotating tracks of the projections 24. For this reason, the projections 22 will not be brought into contact with the lower surfaces 10a of the lower flanges 10 of the reels 4 and will not adversely influence rotation of the reels 4. The projection height t3 of the projection 22 is selected preferably within a range of 0.10 to 0.14 mm so that the projection 22 does not abut against the lower surface 10a of the corresponding lower flange 10 and facilitates easy flow of the molten resin.

Figure 7:
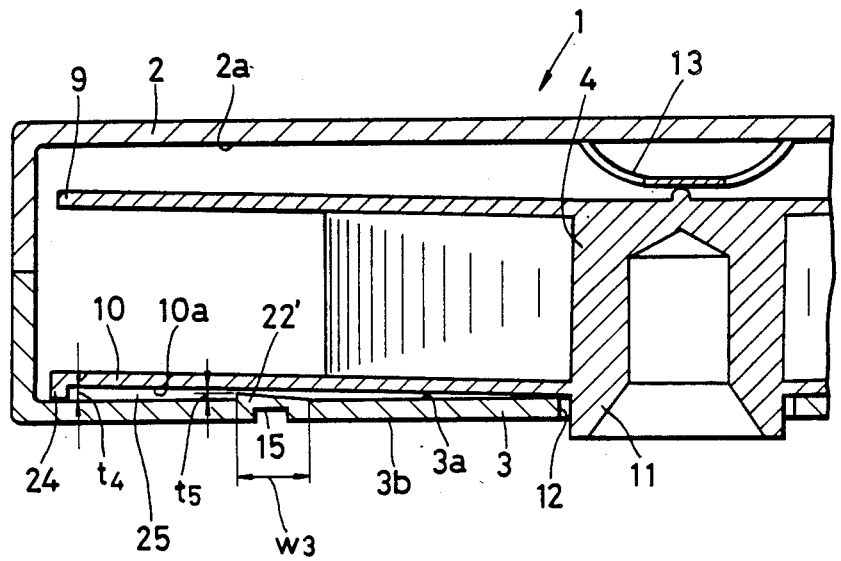
FIG. 7 is an enlarged cross-sectional view, similar to FIG. 5, of a magnetic tape cassette for a video tape recorder according to a second embodiment of the present invention.

FIG. 7 shows another embodiment of the present invention. In this embodiment, each projection 22' is formed to have a substantially triangular cross-section with a flat upper surface which is inclined inward toward a corresponding reel fitting hole 12. The projection 22' is formed substantially in the same position as in the embodiment shown in FIG. 4. The projection 22' has a height t5 which is in the range of 0.05 to 0.5 mm and preferably a range of 0.10 to 0.14 mm as in the case of the embodiment shown in FIG. 4.

According to this embodiment, even if reels 4 are strongly pressed downward by leaf springs 13 and their lower flanges 10 are inclined downward from the outer peripheries toward their centers as shown in FIG. 7 to define a substantially triangular gap 25 between lower surfaces 10a of the lower flanges 10 and an inner surface 3a of the bottom wall of the lower half 3, the projections 22' will not abut against the lower surfaces 10a of the lower flanges 10.

The upper end faces or surfaces of the projections 22 are preferably inclined such that, when the lower flanges 10 are inclined, the inclination of the upper end faces is substantially parallel to or steeper than that of inclined lower surfaces 10a of the lower flanges 10. In this embodiment, the projection 22' has a width w3 in a range of 7 to 10 mm. In this case, since the thickness of the lower half 3 is gradually increased from the injection gate 20 toward the guide groove 15, the flow of the molten resin is smooth during the molding operation.

Although the present invention has been described with reference to the two embodiments, various changes and modifications can be made in accordance with the technical principle of the present invention. For example, the position and shape of the projection 22 or 22' as in the two embodiments described above are not limited to those of these two embodiments, and can be variously changed in accordance with the position and shape of the guide groove 15. Furthermore, in the two embodiments described above, the projections 24 on the lower surfaces 10a of the lower flanges 10 are annular so as to form a gap between the lower surfaces 10a of the lower flanges 10 and the inner surface 3a of the bottom wall of the lower half 3. However, the projection 24 can be discontinuous projections. Alternatively, a recess can be formed in the almost entire lower surface 10a of each flange 10 or in a part thereof corresponding to the projection 22 or 22' so as to form an entire or a partial gap between the lower surface 10a and the inner surface 3a.

In the above embodiments, the description has been made with reference to a tape cassette of two reel type. However, the present invention is similarly applicable to a tape cassette of single reel type. Furthermore, application of the present invention is not limited to a magnetic tape cassette for a video tape recorder but can be extended to a tape cassette for various other recording and/or reproducing apparatus and information processing apparatuses.

We claim:

1. In a tape cassette comprising a cassette casing having upper and lower halves molded by injection molding from a synthetic resin, two reels which are mounted for rotation in said cassette casing and have at least lower flanges, and a groove, which is provided in an outer surface of a bottom wall of said lower half of the casing with at least a part of said groove being present in a region of the bottom wall of said lower half that is adjacent each of said lower flanges of said two reels, the improvement comprising at least a first projection being formed on at least a portion of an inner surface of the bottom wall of said lower half to overlie at least a part of said groove and each of said two reels having at least a second projection being formed near an outer periphery of its lower flange, said second projection of each reel moving in a separate circular path during rotation of the reels, said first projection being subdivided into two longitudinally extending portions with one portion for each reel and each portion having a position and length to be received in the circular path of the second projection of a respective reel, said portion of the first projection facilitating flow of a molten resin injection near said groove during molding of the lower half.

2. In a tape cassette according to claim 1, wherein said second projection is formed with a ring shape along the outer periphery of each of said lower flanges.

3. In a tape cassette according to claim 1, wherein each portion of said first projection has a flat upper surface.

4. In a tape cassette according to claim 3, wherein each flat upper surface extends parallel to the inner surface of the bottom wall.

5. In a tape cassette according to claim 3, wherein each flat upper surface is inclined at an angle to the inner surface of the bottom wall.

* * * * *